(12) United States Patent
Dropps et al.

(10) Patent No.: US 11,888,751 B2
(45) Date of Patent: Jan. 30, 2024

(54) ENHANCED VIRTUAL CHANNEL SWITCHING

(71) Applicant: Hewlett Packard Enterprise Development LP, Houston, TX (US)

(72) Inventors: Frank R. Dropps, Annandale, MN (US); Joseph G. Tietz, Moneta, VA (US); Derek Alan Sherlock, Fort Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/672,481

(22) Filed: Feb. 15, 2022

(65) Prior Publication Data

US 2023/0262001 A1   Aug. 17, 2023

(51) Int. Cl.
   *H04L 47/2441*   (2022.01)
   *H04L 47/2483*   (2022.01)
   *H04L 47/78*    (2022.01)
   *H04L 47/52*    (2022.01)
   *H04L 47/10*    (2022.01)

(52) U.S. Cl.
   CPC ...... *H04L 47/2441* (2013.01); *H04L 47/2483* (2013.01); *H04L 47/39* (2013.01); *H04L 47/521* (2013.01); *H04L 47/781* (2013.01)

(58) Field of Classification Search
   CPC ..... H04L 47/39; H04L 47/521; H04L 47/781; H04L 47/2441; H04L 47/2483
   See application file for complete search history.

(56) References Cited

U.S. PATENT DOCUMENTS

| | | | | |
|---|---|---|---|---|
| 5,905,729 | A * | 5/1999 | Gaddis | H04L 47/11 370/399 |
| 7,856,026 | B1 * | 12/2010 | Finan | H04L 49/3045 370/413 |
| 8,625,427 | B1 * | 1/2014 | Terry | 370/413 |
| 2003/0233653 | A1 * | 12/2003 | Hwang | H04N 21/47 348/E5.103 |
| 2005/0063394 | A1 * | 3/2005 | Ko | H04L 49/254 370/399 |
| 2016/0006665 | A1 * | 1/2016 | Lamb | H04L 47/622 370/412 |
| 2020/0076742 | A1 * | 3/2020 | McDonald | H04L 47/39 |
| 2020/0106718 | A1 * | 4/2020 | Lesartre | H04L 47/6275 |

* cited by examiner

*Primary Examiner* — Melanie Jagannathan
(74) *Attorney, Agent, or Firm* — Park, Vaughan, Fleming & Dowler LLP

(57) ABSTRACT

A system for facilitating enhanced virtual channel switching in a node of a distributed computing environment is provided. During operation, the system can allocate flow control credits for a first virtual channel to an upstream node in the distributed computing environment. The system can receive, via a message path comprising the upstream node, a message on the first virtual channel based on the allocated flow control credits. The system can then store the message in a queue associated with an input port and determine whether the message is a candidate for changing the first virtual channel at the node based on a mapping rule associated with the input port. If the message is a candidate, the system can associate the message with a second virtual channel indicated in the mapping rule in the queue. Subsequently, the system can send the message from the queue on the second virtual channel.

20 Claims, 8 Drawing Sheets

ENHANCED VIRTUAL CHANNEL SWITCHING

FIELD

The present disclosure relates to communication networks. More specifically, the present disclosure relates to a method and system for facilitating enhanced virtual channel (VC) switching.

BRIEF DESCRIPTION OF THE FIGURES

In the figures, like reference numerals refer to the same figure elements.

DETAILED DESCRIPTION

Figure 1A:
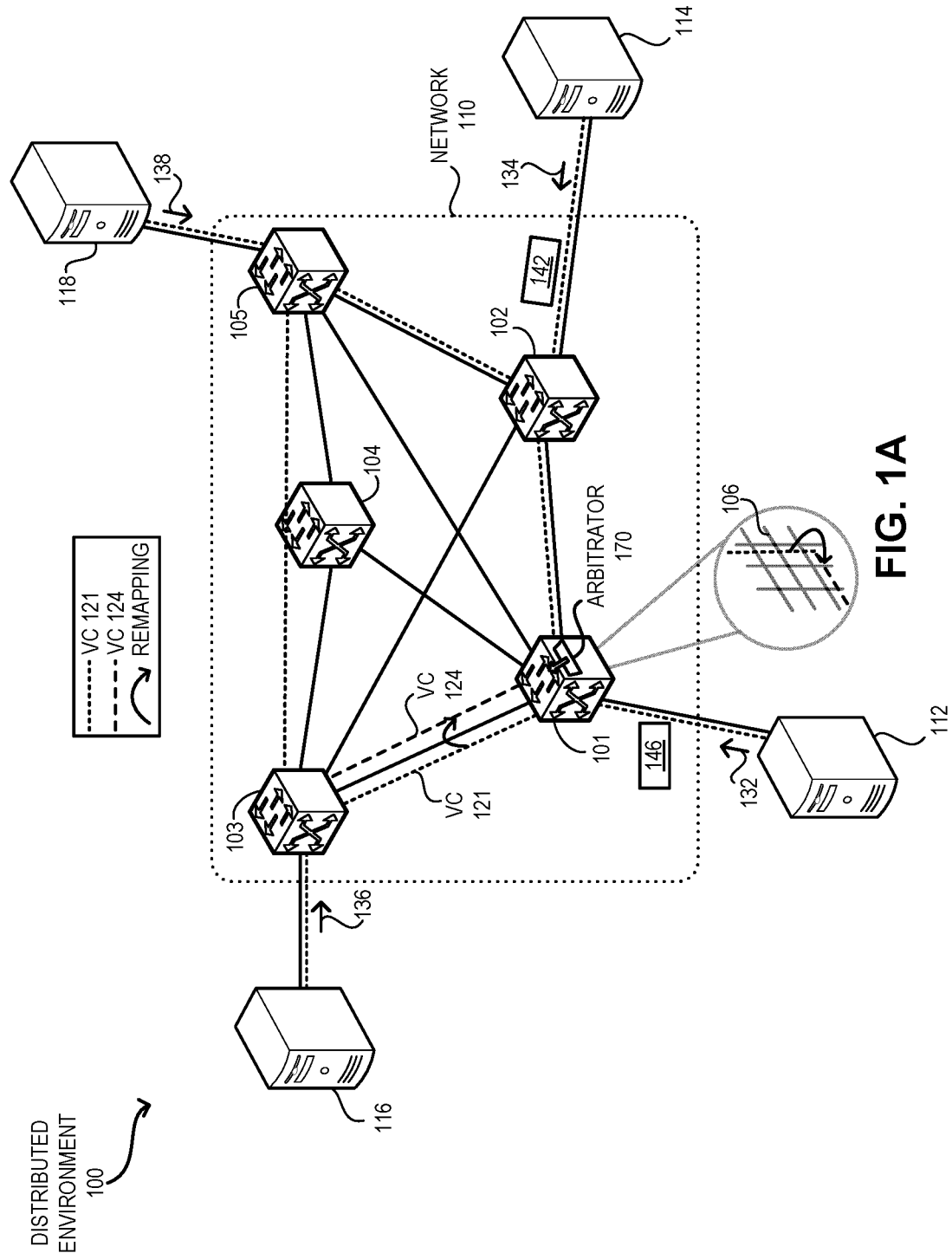
FIG. 1A illustrates an exemplary network supporting enhanced virtual channel switching, in accordance with an aspect of the present application.

The following description is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

High-capacity interconnects are the delivery medium for a variety of applications running on physical and virtual devices. Such applications have brought with them an increasing demand for bandwidth. As a result, equipment vendors race to build larger devices with significant processing capabilities. Consequently, a distributed system may include different types of nodes, such as a source node that issues a message (e.g., a request for a transaction on a piece of data in a request message) and a destination node that processes the message (e.g., performs the requested transaction). Typically, a source or destination node can be an endpoint, such host or a user device. A respective destination node can receive messages from a plurality of source nodes.

The high-capacity interconnects can include communication resources, such as communication links (e.g., between two devices in a network) and internal message paths (e.g., via internal crossbar fabrics of a device), for carrying the messages. Typically, the messages can belong to independent message flows. For example, the messages belonging to a particular application from a requesting device to a responder device can be a message flow. Since the cost and architectural limitation may restrict the availability of the communication resources, multiple message flows may share a common physical communication link or internal message path. A respective message flow can be assigned to separate VCs, which can also be referred to as virtual lanes, for facilitating independent flow control credit management for a segment of the communications resources. While VC-based communication can bring many desirable features to a computing environment, some issues remain unsolved regarding VC management and remapping in a node.

One aspect of the present technology can provide a system for facilitating enhanced virtual channel switching in a node of a distributed computing environment. During operation, the system can allocate flow control credits for a first virtual channel to an upstream node in the distributed computing environment. The system can receive, via a message path comprising the upstream node, a message on the first virtual channel based on the allocated flow control credits. The system can then store the message in a queue associated with an input port and determine whether the message is a candidate for changing the first virtual channel at the node based on a mapping rule associated with the input port. If the message is a candidate, the system can associate the message with a second virtual channel indicated in the mapping rule in the queue. Subsequently, the system can send the message from the queue on the second virtual channel.

In a variation on this aspect, the message path can include a communication link and the internal switching fabric of a node.

In a variation on this aspect, the system can update a list associated with the second virtual channel with a location of the message in the queue. A respective entry of the list can correspond to a message associated with the second virtual channel.

In a variation on this aspect, the system can determine the first virtual channel as an ingress virtual channel for the message based on metadata stored in the queue in association with the message.

In a further variation, the system can allocate flow credit for the first virtual channel and send the flow credit to the upstream node.

In a variation on this aspect, the message is associated with the second virtual channel prior to the message reaching an arbitration point in the node.

In a further variation, the system can arbitrate based on the second virtual channel for forwarding the message.

In a variation on this aspect, the system can determine the second virtual channel based on applying an offset value in the mapping rule to the first virtual channel.

In a variation on this aspect, the first virtual channel can belong to a first set of virtual channels, and the second virtual channel can belong to a second set of virtual channels. The mapping rule can then indicate channel switching from the first set of virtual channels to the second set of virtual channels.

The examples described herein solve the problem of deadlocks in a distributed computing environment due to lack of communication resources by (i) determining an egress VC for a packet received on an ingress VC at a node; and (ii) allocating the packet to the egress VC prior to arbitrating for resources at the corresponding output port of the node, thereby switching the VCs for the message. In this way, the node can facilitate an enhanced virtual channel switching between ingress VC to an egress VC without using extensive computation. The channel switching allows the node to forward the packet bypassing any potential deadlock on the ingress VC.

In a distributed computing environment, communication resources, such as internal switching fabric and communication links between nodes, can be shared among a plurality of message flows. Examples of a node can include, but are not limited to, a switch and an end device (e.g., a host or user device). Typically, the messages belonging to a message flow may not rely on the messages of another message flow. Therefore, these message flows can be independent of each other. A message flow can be allocated a VC for facilitating fine-grained flow control and corresponding buffer resources to the message flow. Hence, the VC can provide flow control credit management to the corresponding message flow for a segment of the communication resources. The VCs allow the message flows to use shared communication resources without interfering with each other.

With existing technologies, a plurality of message flows may share a VC. As a result, a node may receive messages (or packets) of multiple message flows on a VC. Such messages can be tagged by an identifier of the VC (e.g., may include the VC number in the message). Consequently, when the node receives a message on the VC at an input port, the node may not have resources, such as flow credits from an upstream node, associated with the VC at the output port to forward the message. This scarcity of resources associated with the VC can also be present in subsequent nodes in the distributed computing environment and cause circular scarcity for the VC. Since none of these nodes can forward messages on the VC, no node may receive credits for the VC. The unavailability of credit for the VC can create a deadlock for all message flows on the VC.

To solve this problem, a first set of VCs can be switched (or remapped) to a second set of VCs at a subset of nodes of the distributed computing environment. If a message is a candidate for channel switching, for a message received on an ingress VC of the first set, the node can change the ingress VC to an egress VC of the second set. Since the node does not rely on the same VC for receiving and forwarding, the node can forward the message even if credits for the ingress VC are unavailable. In this way, the node can avoid deadlocks. Furthermore, to avoid interference between message flows originating at the node and those passing through the node, the message flows passing through the node can be selected for channel switching. In other words, the channel switching can be applied to incoming message flows from a neighboring switch. If the distributed computing environment is complex, the node may use more than two sets of VCs. In this way, the node can facilitate enhanced virtual channel switching to break forwarding deadlock.

An existing approach for channel switching can be based on performing the channel switching at the arbitration point of a node. The arbitration point for the node may be a hardware-based arbiter (e.g., residing in application-specific integrated circuit (ASIC) chips) of the node. The arbiter may select between multiple internal message paths or buffers for an output port (e.g., an egress link). The selection (or arbitration) can be based on the availability of resources, such as flow credits associated with a VC. However, if the channel switching is performed at the arbitration point, the arbiter must arbitrate across all sets of VCs. The resultant arbiter may be complex and inefficient.

The channel switching process can be further improved by performing the process at a location between the ingress of the node and the arbitration point, thereby avoiding enhanced arbitration for the messages. As a result, the arbiter may be simpler, smaller, and more efficient than the existing approach. The enhanced virtual channel switching process can use virtualized buffers for a received message on an ingress VC. The messages of a respective VC may be indicated by a tracking mechanism, such as a list (e.g., a linked list). The tracking mechanism can be maintained by the hardware of the node. Since a buffer can be virtual, the credit management for individual VCs may not rely on the message's physical address in the buffer.

Since the message can be received based on the credits allocated for the ingress VC, when the message is stored in the buffer associated with an input port, the message is tagged with the ingress VC. For example, the node can use a metadata field in the entry of the buffer to store information indicating the ingress VC. If the message is a candidate for channel switching, the node can determine an egress VC for the message. The node can use a remapping table to determine whether to perform virtual channel switching and, if performed, the egress VC for the message. Hence, if virtual channel switching is not performed, the egress VC of the message can be the same as the ingress VC. The remapping table can be stored or encoded in a storage location associated with the input port. The storage location can be a piece of hardware (e.g., a register) or a memory location associated with the switch. Hence, the virtual channel switching can be programmable at a port-level granularity. However, if such flexibility is not needed, a subset of the communication resources can be preselected for performing the channel switching.

The node can then update the list of egress VC with the location of the message (e.g., with a pointer to the message). As a result, the arbiter of the node can arbitrate based on the egress VC without requiring access to all VCs. When the arbiter grants the forwarding request for the message (i.e., selects for forwarding), the tag of the message allows the node to determine that the message is received on the ingress VC. Accordingly, the node can allocate credits for the ingress VC to an upstream node. In this way, the node can facilitate enhanced virtual channel switching to avoid deadlocks in the distributed computing environment.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z or Compute Express Link (CXL) network, a processor device, or a fabric switch comprising a plurality of similar or heterogeneous smaller physical and/or virtual switches.

A phrase indicating a device, such as "node," "machine," "entity," or "device" may indicate a switch and an end host, such as a user device. The term "message" refers to a group of bits that can be transported together across a network. "Message" should not be interpreted as limiting examples of the present examples to a particular layer of a network. "Message" can be replaced by other terminologies referring to a group of bits, such as "information," "data," "request,"

"response," "packet," "frame," "cell," "datagram," or "transaction." Furthermore, the term "port" can refer to the port that can receive, store, or transmit data. "Port" can also refer to the hardware, software, and/or firmware logic that can facilitate the operations of that port.

FIG. 1A illustrates an exemplary network supporting enhanced virtual channel switching, in accordance with an aspect of the present application. A distributed environment 100 can include a plurality of nodes, such as switches and end devices. Environment 100 can include a network 110 comprising switches 101, 102, 103, 104, and 105. In this example, switch 104 can be a transparent switch (e.g., a transparent optical switch). Environment 100 can also include end devices (or hosts) 112, 114, 116, and 118 coupled to switches 101, 102, 103, and 105, respectively. In some examples, network 110 can be a CXL network, and a respective switch of network 110 can be a CXL component. Under such a scenario, communication among the switches in network 110 can be based on memory-semantic communications. A respective packet forwarded via network 110 may be referred to as a transaction, and the corresponding data unit can be a flit. In some other examples, network 110 can be an Ethernet, InfiniBand, PCIe, Gen-Z, or other networks, and may use a corresponding communication protocol, such as Internet Protocol (IP), FibreChannel over Ethernet (FCoE), or other protocol.

In environment 100, communication resources, such as internal switching fabric 106 in switch 101 and communication links in network 110, can be shared among a plurality of message flows 132, 134, 136, and 138 originating from devices 112, 114, 116, and 118, respectively. For example, message flow 132 can be from device 112 to device 118. Similarly, message flow 134 can be from device 114 to device 116. Switch 101 may be a transient switch for message flow 136. Typically, these message flows can be independent of each other. A respective message flow can be allocated a VC 121 for facilitating fine-grained flow control and corresponding buffer resources to the message flow. Hence, VC 121 can provide flow control credit management for a segment of the communication resources. VC 121 may allow message flows 132, 134, 136, and 138 to use shared communication resources without interfering with each other.

With existing technologies, message flows 132, 134, 136, and 138 may share VC 121. As a result, switch 101 may receive messages of message flows 132 and 134 on VC 121. Such a message, such as messages 146 and 142 of message flows 132 and 134, respectively, can be tagged by an identifier of VC 121 (e.g., may include a VC number of VC 121 in message 142). Consequently, when switch 101 receives message 142 on VC 121 at an input port, switch 101 may have already used resources, such as flow credits, associated with VC 121 for forwarding message 146. Hence, switch 101 may not have resources associated with VC 121 at the output port to forward message 142. This scarcity of resources associated with VC 121 can also be present in other switches in network 110 and cause circular resource scarcity for VC 121. Since none of these switches can forward messages on VC 121, no switch may receive credits for VC 121. The unavailability of credit for VC 121 can create a deadlock for all message flows on VC 121.

To solve this problem, VC 121 can be switched (or remapped) to VC 124 at a subset of switches of network 110. During operation, switch 101 can receive message 142 on ingress VC 121. If message 142 is a candidate for channel switching, switch 101 can change ingress VC 121 to egress VC 124 (denoted with an arrow). In some examples, the virtual channel switching from VC 121 to VC 124 may occur in switching fabric 106. As a result, even if switch 101 depletes the resources associated with VC 121 for forwarding message 146, switch 101 can use VC 124 to forward message 142. In other words, since switch 101 does not rely on the same VC 121 for forwarding, switch 101 can forward message 142 even if credits for VC 121 are unavailable. In this way, switch 101 can avoid circular deadlocks in network 110 because the circular dependency on VC 121 in network 110 can be removed at switch 101 with virtual channel switching.

Furthermore, to avoid interference between message flows, switch 101 may distinguish between message flow 132 originating (i.e., received via an edge port from end device 112) at switch 101 and message flow 134 passing through switch 101 (i.e., received via an inter-switch port from switch 102). Switch 101 can then select message flow 134 for channel switching. In other words, the channel switching can be applied to incoming message flows from neighboring switch 102. On the other hand, switch 101 may continue to use VC 121 for message flow 132 without applying channel switching. If environment 100 is complex, switch 101 may use more than two sets of VCs. In this way, switch 101 can facilitate enhanced virtual channel switching to break forwarding deadlock in network 110.

An existing approach for channel switching can be based on performing the channel switching from VC 121 to VC 124 at the arbitration point of switch 101. The arbitration point for switch 101 may be a hardware-based arbiter 170 of switch 101. Arbiter 170 can be deployed using the ASIC of switch 101. Arbiter 170 may select between multiple internal message paths or buffers for an output port (e.g., an egress link) for switch 101. Arbiter 170 may perform the selection (or arbitration) based on the availability of resources, such as flow credits associated with VC 121.

However, if the channel switching is performed after the arbitration point, arbiter 170 must arbitrate across all sets of VCs associated with switch 101. Facilitating such a channel switching process may cause arbiter 170 to be relatively complex and inefficient. The channel switching process for message 142 at switch 101 can be further enhanced by performing the process at the ingress point of message 142, thereby avoiding enhanced arbitration for message 142. As a result, arbiter 170 can become simpler, smaller, and more efficient than the existing approach.

Figure 1B:
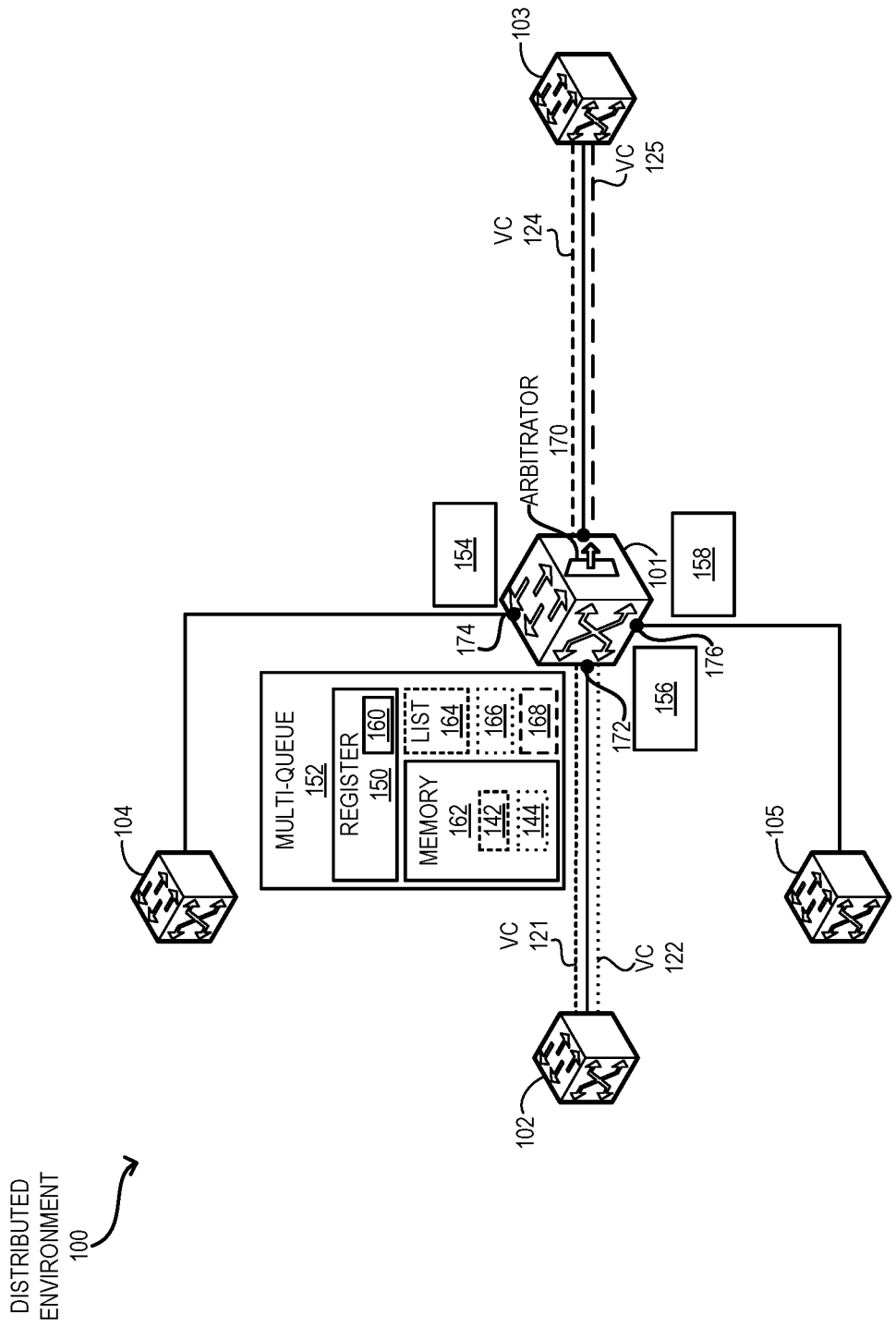
FIG. 1B illustrates an exemplary switch supporting enhanced virtual channel switching, in accordance with an aspect of the present application.

FIG. 1B illustrates an exemplary switch supporting enhanced virtual channel switching, in accordance with an aspect of the present application. In this example, switch 101 can be coupled to switches 102, 104, and 105 via ports 172, 174, and 176, respectively. Switch 101 can maintain a multi-queue for a respective source device. A multi-queue can allow multiple traffic queues to be configured for a network port (or interface). For example, switch 101 can maintain multi-queues 152, 154, and 156 at ports 172, 174, and 176, respectively, for the corresponding sources. A respective multi-queue can be a dynamically allocated multi-queue shared among the message flows from the source. Multi-queue 152 may be oblivious to the allocation of credits to switch 102 for individual VCs as long as the total credit count for switch 102 conforms to the size of memory 162 (e.g., a random-access memory (RAM) module) of multi-queue 152. Therefore, the total credit count should represent a memory size less than or equal to the size of memory 162. Memory 162 can provide the virtualized buffers for a respective VC.

The enhanced virtual channel switching process can use virtualized buffers in memory 162 for message 142 on ingress VC 121. Since the same memory 162 can store buffers for a respective VC, which message belongs to which VC can be indicated by a list (e.g., a linked list). For example, when switch 101 receives message 142 on VC 121, memory 162 can store message 142. Switch 101 can then update a list 164 associated with VC 121 with the location of message 142 in memory 162. Similarly, if switch 101 receives message 144 on VC 122, memory 162 can store message 144. Switch 101 can then update a list 166 associated with VC 122 with the location of message 144 in memory 162. Lists 164 and 166 can be maintained by the hardware of switch 101. In this way, buffers for VCs 121 and 122 can be virtual buffers. Hence, the credit management for VCs 121 and 122 may not rely on the physical address in memory 162.

Since message 142 can be received based on the credits allocated for VC 121, when the message is stored in memory 162, message 142 is tagged with VC 121 (i.e., the ingress VC of message 142). For example, switch 101 can use a metadata field in the entry of the virtual buffer in memory 162 to store information indicating VC 121 (e.g., a VC number). Switch 101 can then determine whether message 142 is a candidate for channel switching based on a remapping table. Multi-queue 152 can be equipped with a register 150 that can store a subset of entries 160 of the remapping table that are associated with port 172. A respective entry of entries 160 can include a remapping rule, which can indicate how the channel switching should be performed for a message that is received via port 172 and is to be forwarded via an output port.

Based on entries 160, switch 101 can determine an egress VC 124 for message 142. In the same way, switch 101 can determine an egress VC 125 for message 144. Entries 160 may indicate that VCs 124 and 125 can be determined by adding a predetermined offset (e.g., a predetermined positive integer value) to VC 121 and 125, respectively. Suppose that VCs 121 and 122 are indicated by VC numbers 0 and 1, respectively, and the offset value is 3. VCs 124 and 125 can then be indicated by VC numbers 3 and 4, respectively. Entries 160 may also indicate if channel switching is not be performed for an ingress VC. Since entries 160 can be stored in register 150 associated with input port 172. Hence, the virtual channel switching can be programmable for port 172 (and ports 174 and 176). However, if such flexibility is not needed, a subset of the communication resources at switch 101 can be preselected for performing the channel switching. For example, a set of internal message paths within switch 101 can always perform the enhanced virtual channel switching.

Switch 101 can then update list 168 associated with VC 124 (e.g., the egress VC of message 142) with the location of message 142. The location can be a pointer to the physical address of message 142 in memory 162. As a result, arbiter 170 can arbitrate based on VC 124 without requiring access to all VCs. When arbiter 170 grants the forwarding request for message 142 (i.e., selects for forwarding), the tag of message 142 can allow switch 101 to determine that message 142 is received on VC 121. Accordingly, switch 101 can allocate credits for VC 121 to switch 102. The flow credits can then be allocated for VC 121 for an incoming message even if channel switching is performed prior to reaching arbiter 170 in switch 101. In this way, switch 101 can facilitate enhanced virtual channel switching to avoid deadlocks in environment 100.

Entries 160 can be generated by the routing module that determines paths in environment 100. The routing module can be a software-based routing daemon that operates based on a routing protocol. Entries 160 facilitate configuration control based on the decision selection values (e.g., the offset value) indicated by the remapping rules in register 150. In some examples, decision selection values may remain static without dynamically changing while established paths remain active. Furthermore, the same remapping rule can be applied identically to a respective ingress VC at multi-queue 152. As a result, a single remapping rule can be applicable to all traffic from an input port to an output port. The example in FIG. 1B, the virtual channel switching is performed based on multi-queue 152, which is an input buffer. The virtual channel switching may also be deployed in switch 101 based on an output buffer 158 (or any other approach) that facilitates the VC remapping before the arbitration point. In other words, the virtual channel switching for message 142 can be performed at any location in switch 101 prior to message 142 reaching arbitrator 170.

Figure 2:
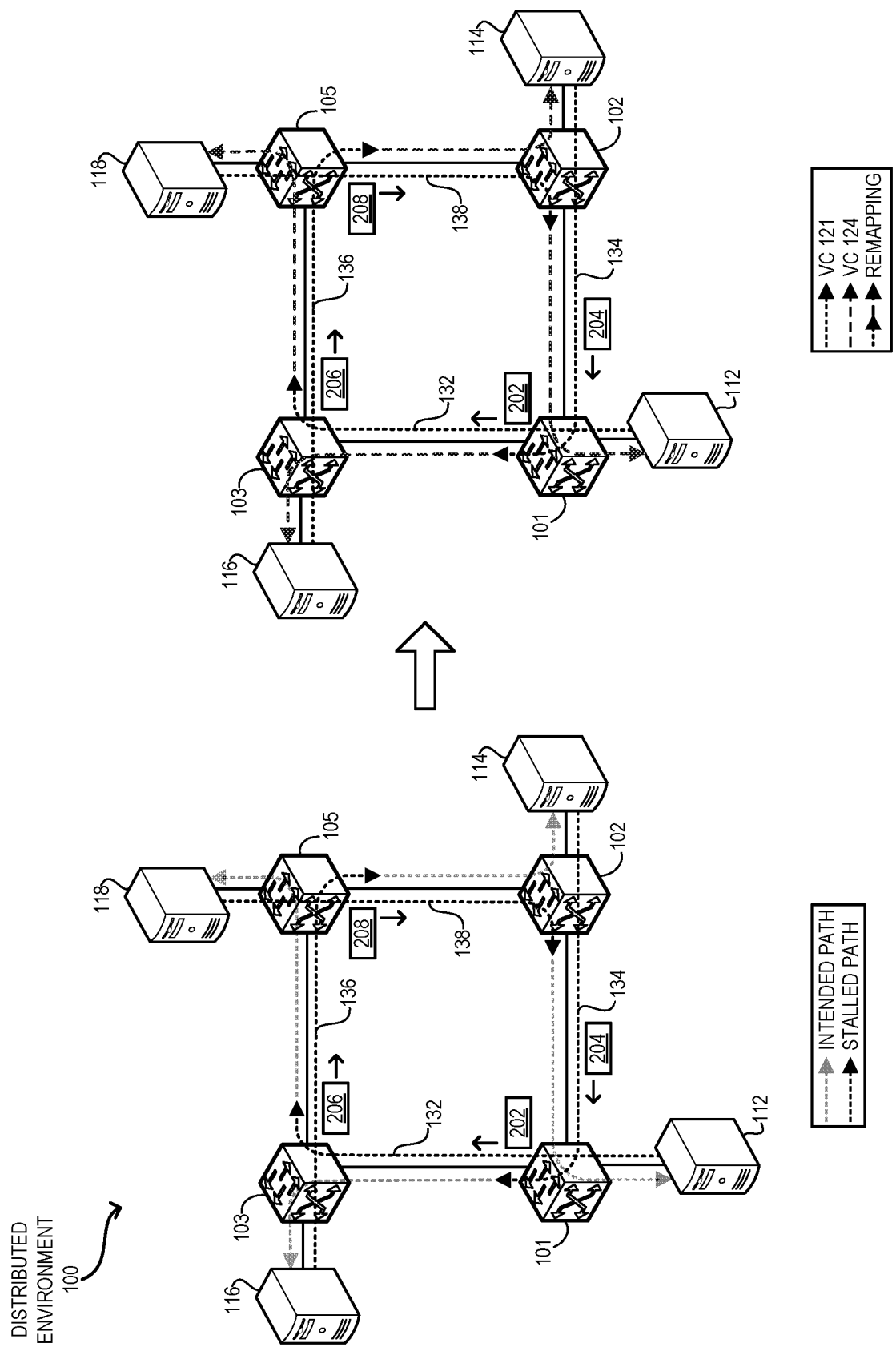
FIG. 2 illustrates exemplary deadlock avoidance using enhanced virtual channel switching, in accordance with an aspect of the present application.

FIG. 2 illustrates exemplary deadlock avoidance using enhanced virtual channel switching, in accordance with an aspect of the present application. As described in conjunction with FIG. 1A, message flows 132, 134, 136, and 138 may share VC 121. Message flow 132 can be between end devices 112 and 118, and message flow 134 can be between end devices 114 and 116. As a result, switch 101 may receive messages 202 and 204 of message flows 132 and 134, respectively, on VC 121. When switch 101 receives message 204 of message flow 134, the intended path for message 204 can be to end device 116 via switch 103. However, switch 101 may have used all currently available forwarding resources, such as flow credits, associated with VC 121 to forward message 202 to switch 103. As a result, switch 101 may not be able to forward message 204.

Switch 103 may also receive a message 206 of message flow 136. When switch 103 receives message 202, the intended path for message 202 can be to end device 118 via switch 105. However, switch 103 may have used all currently available flow credits associated with VC 121 to forward message 206 to switch 105. As a result, switch 103 may not be able to forward message 202. Similarly, switch 105 may receive a message 208 of message flow 138. When switch 105 receives message 206, the intended path for message 206 can be to end device 114 via switch 102. However, switch 105 may have used all currently available flow credits associated with VC 121 to forward message 208 to switch 102. As a result, switch 105 may not be able to forward message 206. However, since switch 102 may have used currently available flow credits associated with VC 121 to forward message 204 to switch 101, switch 102 may not be able to forward message 208.

Under such a scenario, messages 202, 204, 206, and 208 can be in corresponding buffers in switches 103, 101, 105, and 102, respectively. Since none of these switches can forward messages on VC 121, none of switches 103, 101, 105, and 102 may receive credits for VC 121. Here, the circular unavailability of credit for VC 121 can create a deadlock for message flows 132, 134, 136, and 138 on VC 121. The enhanced virtual channel switching at switches 101, 102, 103, and 105 can resolve this issue by forwarding messages 202, 204, 206, and 208 on a different egress VC, such as VC 124. Even though switch 101 may not have credits for VC 121, switch 101 can use credits for VC 124 to forward message 204 to switch 103 via the intended path. Similarly, switches 103, 105, and 102 can use credits for VC 124 to forward messages 202, 206, and 208, respectively, via corresponding intended paths. Although not shown in FIG. 2, messages 202, 204, 206, and 208 could optionally be switched back to VC 121 before forwarding to end devices 118, 116, 114, and 112 by switches 105, 103, 102, and 101 respectively.

Figure 3:
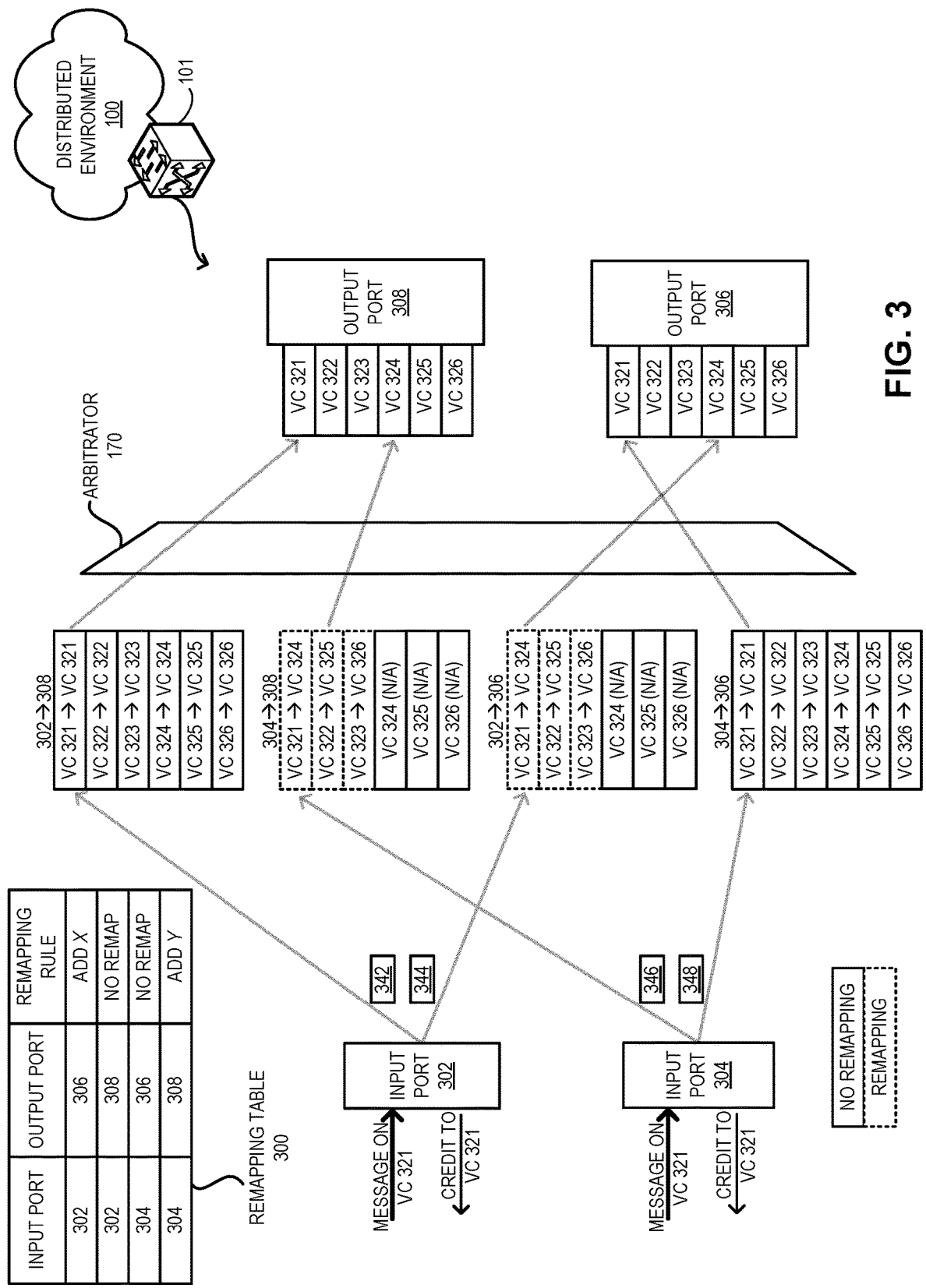
FIG. 3 illustrates enhanced virtual channel switching at a node, in accordance with an aspect of the present application.

FIG. 3 illustrates enhanced virtual channel switching at a node, in accordance with an aspect of the present application. Switch 101 can be equipped with a plurality of ports 302, 304, 306, and 308. During operation, input port 302 can receive messages 342 and 344 on VC 321. Similarly, input port 304 can receive messages 346 and 348 on VC 321. Messages 342 and 346 can be forwarded via output port 308, and messages 344 and 348 can be forwarded via output port 306. To facilitate enhanced virtual channel switching for these messages, switch 101 can use a remapping mechanism to determine an egress VC. Examples of the remapping mechanism can include, but are not limited to, looking up a data structure (e.g., a table) comprising a mapping between the ingress and egress VCs, applying a mathematical calculation to the ingress VC (e.g., addition, subtraction, multiplication etc.), VC set selection (e.g., a set of egress VCs are selected for a set of ingress VCs), and one-to-one correlated value mapping. In this example, switch 101 can maintain a remapping table 300 that can include a set of remapping rules indicating how the channel switching should be performed for the combinations of input ports 302 and 304, and output ports 306 and 308.

For messages with input port 302 and output port 306, the remapping rule of table 300 can indicate that an egress VC should be determined by adding an offset value of "X" to the ingress VC. Here, X can represent a predetermined positive or negative integer value that can be added to the VC number indicating the ingress VC. Similarly, the remapping rule for input port 304 and output port 308 can indicate that an egress VC should be determined by adding an offset value of "Y." The values of X and Y can be the same or separated by a value of "Z," which can ensure that there is no conflict in the determined egress VCs. For all other input and output port combinations, the remapping rule can indicate that no remapping should be performed. For such combinations, the ingress and egress VCs can remain the same.

Accordingly, for messages from input port 302 to output port 308 and from input port 304 to output port 306, the ingress and egress VCs remain the same. On the other hand, the values of X and Y can be 3 in this example. Hence, ingress VCs 321, 322, and 323 are switched (or remapped) to egress VCs 324, 325, and 326, respectively, for messages from input port 302 to output port 306 and from input port 304 to output port 308. Furthermore, since VCs 324, 325, and 326 are used as egress VCs, VCs 324, 325, and 326 may not be used as ingress VCs for messages from input port 302 to output port 306 and from input port 304 to output port 308. Based on the remapping rules, messages 342 and 348 remain on VC 321. However, messages 344 and 346 are switched to VC 324 before reaching arbiter 170. Consequently, arbiter 170 can arbitrate for messages 342, 344, 346, and 348 based on VCs 321, 324, 324, and 321, respectively, at the corresponding output ports. In this way, the same remapping rule can be applied identically to a respective ingress VC. Therefore, a single remapping rule can be applied to all traffic from an input port to an output port. As described above, the VC mapping may involve assigning a new VC without using a table. Furthermore, the VC mapping can be based on one or more remapping algorithms, such as subtraction, multiplication, VC set selection, one-to-one correlated value mapping, and any other mapping algorithm.

Figure 4:
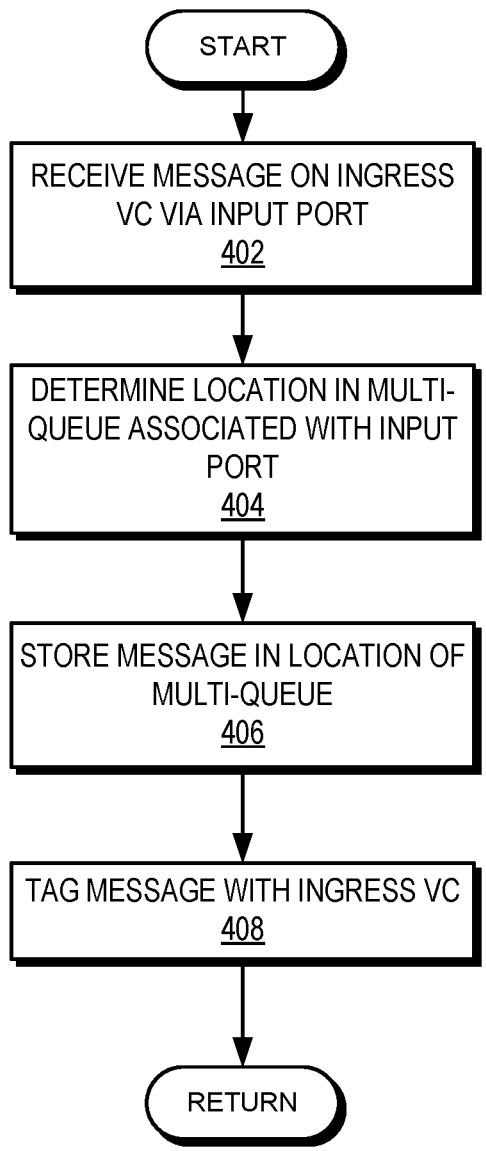
FIG. 4 presents a flowchart illustrating the process of a node processing a packet received over an ingress VC, in accordance with an aspect of the present application.

FIG. 4 presents a flowchart illustrating the process of a node processing a packet received over an ingress VC, in accordance with an aspect of the present application. During operation, the node can receive a message on an ingress VC via an input port (operation 402). The node can then determine a location in the multi-queue associated with the input port (operation 404) and store the message in the location of the multi-queue (operation 406). The node can also tag the message with the ingress VC (operation 408). The node can store the VC number as a piece of metadata in a field associated with the message for the tagging. Even though the process in this example is described based on an input buffer, the virtual channel switching for the message can be performed at any location (e.g., an output buffer) in the switch prior to the message reaching the arbitration point.

Figure 5A:
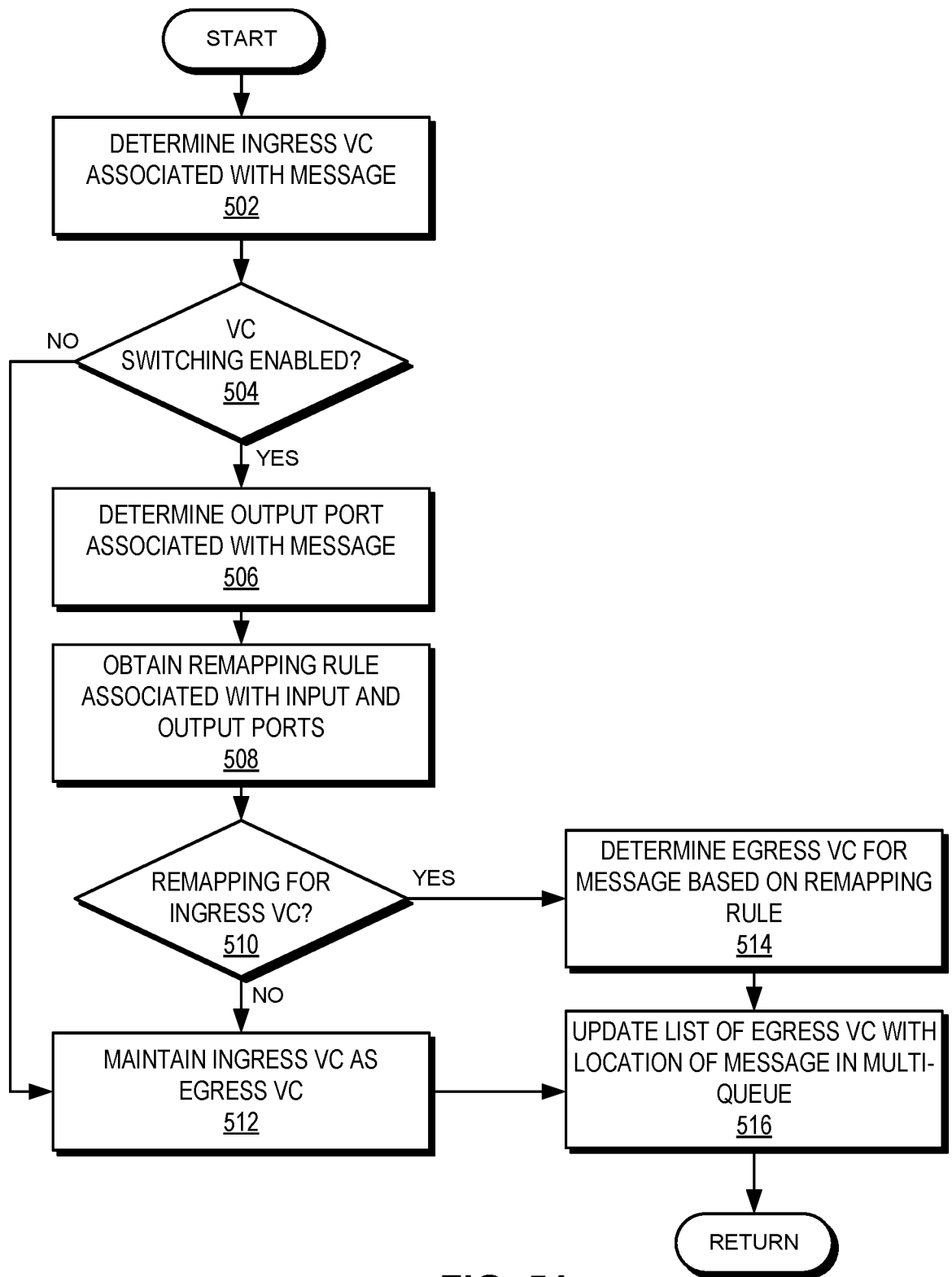
FIG. 5A presents a flowchart illustrating the process of a node remapping an ingress VC of a packet to an egress VC, in accordance with an aspect of the present application.

FIG. 5A presents a flowchart illustrating the process of a node remapping an ingress VC of a packet to an egress VC, in accordance with an aspect of the present application. During operation, the node can determine the ingress VC associated with the message (operation 502) and determine whether virtual channel switching is enabled (operation 504). If virtual channel switching is enabled, the node can determine an output port associated with the message (operation 506) and obtain a remapping rule associated with the input and output ports (operation 508).

The node can then determine whether remapping is needed for the ingress VC (operation 510). If remapping is needed, the node can determine the egress VC for the message based on the remapping rule (operation 514). If virtual channel switching is not enabled (operation 504) or remapping is not needed (operation 510), the node can maintain the ingress VC as the egress VC (operation 512). Upon determining the egress VC (operation 512 or 514), the node can update the list of the egress VC with the location of the message in the multi-queue (operation 516).

Figure 5B:
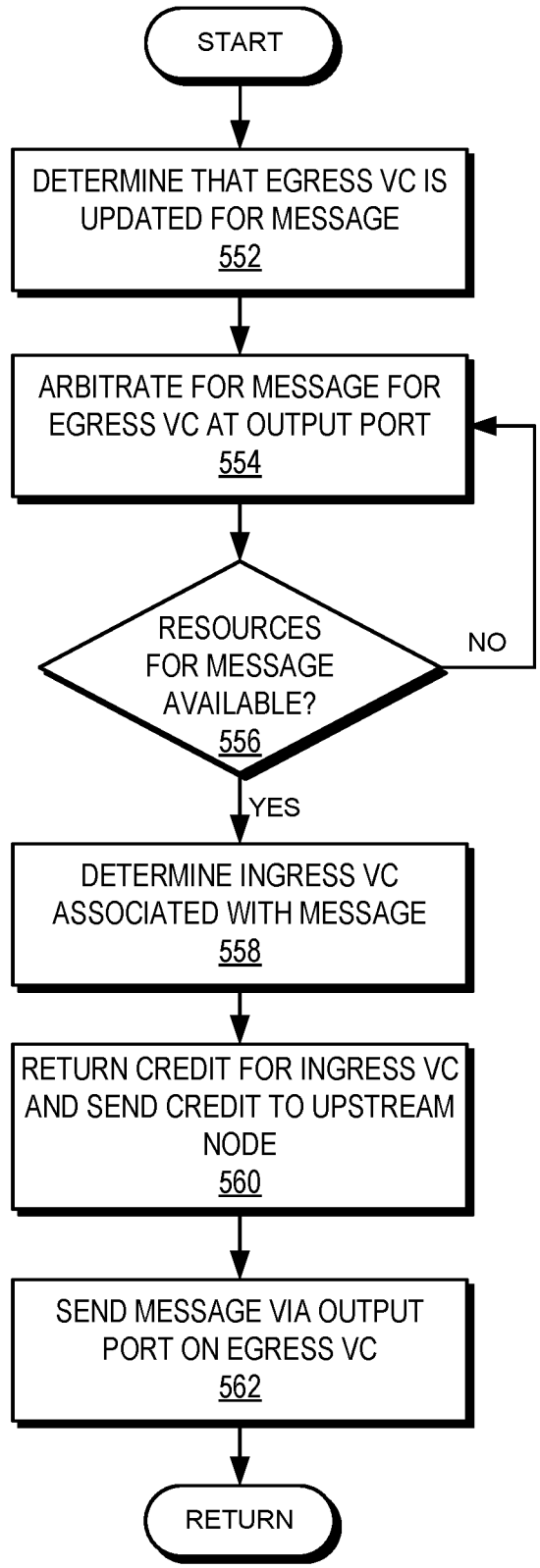
FIG. 5B presents a flowchart illustrating the process of a node forwarding a packet over an egress VC, in accordance with an aspect of the present application.

FIG. 5B presents a flowchart illustrating the process of a node forwarding a packet over an egress VC, in accordance with an aspect of the present application. During operation, the node can determine that the egress VC is updated for a message (operation 552) and arbitrate for the message for the egress VC as the output port (operation 554). The node can determine whether the forwarding resources (e.g., flow credits) for the message are available (operation 556). If the forwarding resources for the message are not available, the node can continue to arbitrate for the message for the egress VC as the output port (operation 554).

On the other hand, if the forwarding resources for the message are available, the node can determine an ingress VC associated with the message (operation 558). The node may determine the ingress VC from the metadata stored with the message in the multi-queue. The node can then return credit for the ingress VC and send the credit to the upstream node (operation 560). Subsequently, the node can send the message via the output port on the egress VC (operation 562).

Figure 6:
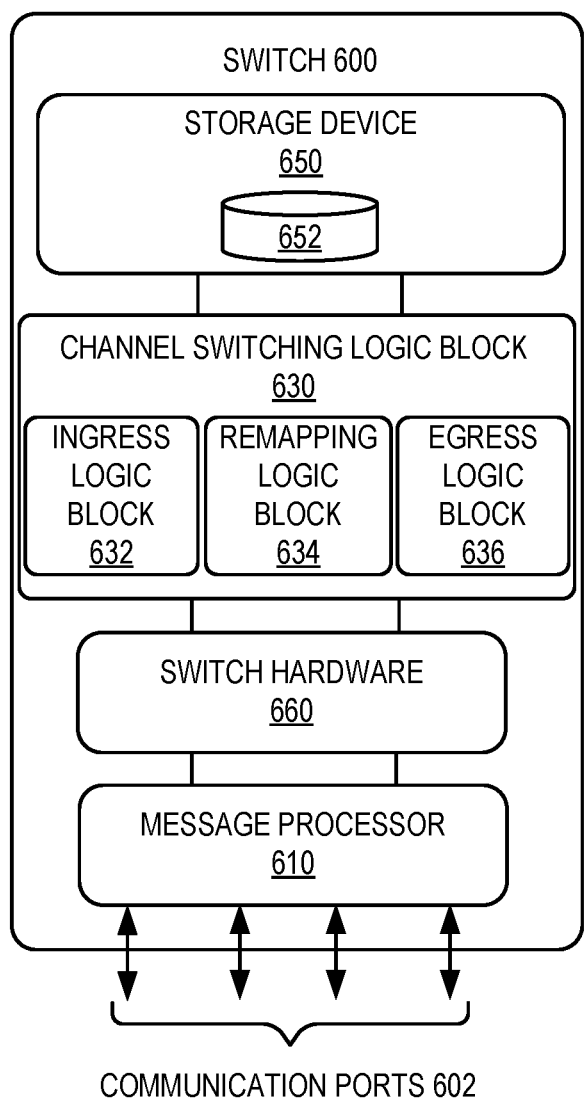
FIG. 6 illustrates an example of a switch with enhanced virtual channel switching support, in accordance with an aspect of the present application.

FIG. 6 illustrates an example of a switch with enhanced virtual channel switching support, in accordance with an aspect of the present application. In this example, a switch 600 can include a number of communication ports 602, a message processor 610, and a storage device 650. Switch 600 can also include switch hardware 660 (e.g., processing hardware of switch 600, such as its ASIC, FPGA, or processor chips), which includes information based on which switch 600 processes messages (e.g., determines output ports for messages or packets). Message processor 610 extracts and processes header information from the received messages. Message processor 610 can identify a switch identifier (e.g., a MAC address, an IP address, and/or any other address field) associated with switch 600 in the header of a message.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can maintain information associated with virtual channel switching in storage device 650 (e.g., in a database 652). Database 652 can be a relational database and may run on one or more Database Management System (DBMS) instances or simple information stored in switch 600. Database 652 can store information associated with routing, configuration, and interfaces of switch 600. Database 652 can also store a remapping table. Switch 600 can include a channel switching logic block 630 that can facilitate enhanced virtual channel switching at switch 600. Channel switching logic block 630 can include an ingress logic block 632, a remapping logic block 634, and an egress logic block 636.

Ingress logic block 632 can store a message in a multi-queue received at switch 600 on an ingress VC. Ingress logic block 632 can also tag the message with the ingress VC. Remapping logic block 634 can determine an egress VC based on a corresponding remapping rule. Remapping logic block 634 can also update the list associated with the egress VC. Egress logic block 636 can arbitrate based on the egress VC. Egress logic block 636 can further determine the ingress VC for the message based on tagging information and allocate credit for the ingress VC.

The data structures and code described in this detailed description are typically stored on a computer-readable storage medium, which may be any device or medium that can store code and/or data for use by a computer system. The computer-readable storage medium includes, but is not limited to, flip/flops, latches, registers, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:
  allocating, from a node of a distributed computing environment, flow control credits for a first virtual channel to an upstream node in the distributed computing environment;
  receiving, via a message path comprising the upstream node, a message on the first virtual channel based on the allocated flow control credits;
  storing the message in a queue associated with an input port at which the message has been received;
  determining whether the message is a candidate for changing the first virtual channel to a different channel at the node based on a mapping rule associated with the input port;
  in response to the message being a candidate, selecting a second virtual channel for the message based on the mapping rule and the first virtual channel;
  associating the message with the second virtual channel in the queue;
  determining that the first virtual channel is an ingress virtual channel for the message based on metadata stored in the queue in association with the message; and
  sending the message from the queue on the second virtual channel based on flow control credits for the second virtual channel.

2. The method of claim 1, wherein the message path comprises a communication link and an internal switching fabric of a node.

3. The method of claim 1, further comprising updating a list associated with the second virtual channel with a location of the message in the queue, wherein a respective entry of the list corresponds to a message associated with the second virtual channel.

4. The method of claim 1, further comprising:
  allocating new flow control credits for the first virtual channel; and
  sending the new flow control credits to the upstream node.

5. The method of claim 1, wherein the message is associated with the second virtual channel prior to the message reaching an arbitration point in the node.

6. The method of claim 5, further comprising arbitrating based on the second virtual channel for forwarding the message, wherein the arbitration includes determining availability of resources associated with the second virtual channel.

7. The method of claim 1, wherein selecting the second virtual channel further comprises applying an offset value in the mapping rule to the first virtual channel.

8. The method of claim 1, wherein the first virtual channel belongs to a first set of virtual channels and the second virtual channel belongs to a second set of virtual channels, and wherein the mapping rule indicates channel switching from the first set of virtual channels to the second set of virtual channels.

9. A non-transitory computer-readable storage medium storing instructions that when executed by a computer cause the computer to perform a method, the method comprising:

allocating, from a node of a distributed computing environment, flow control credits for a first virtual channel to an upstream node in the distributed computing environment;
receiving, via a message path comprising the upstream node, a message on the first virtual channel based on the allocated flow control credits;
storing the message in a queue associated with an input port at which the message has been received;
determining whether the message is a candidate for changing the first virtual channel to a different channel at the node based on a mapping rule associated with the input port;
in response to the message being a candidate, selecting a second virtual channel for the message based on the mapping rule and the first virtual channel;
associating the message with the second virtual channel in the queue;
determining that the first virtual channel is an ingress virtual channel for the message based on metadata stored in the queue in association with the message; and
sending the message from the queue on the second virtual channel based on flow control credits for the second virtual channel.

10. The non-transitory computer-readable storage medium of claim 9, wherein the message path comprises a communication link and an internal switching fabric of a node.

11. The non-transitory computer-readable storage medium of claim 9, wherein the method further comprises updating a list associated with the second virtual channel with a location of the message in the queue, wherein a respective entry of the list corresponds to a message associated with the second virtual channel.

12. The non-transitory computer-readable storage medium of claim 9, wherein the method further comprises:
allocating new flow control credits for the first virtual channel; and
sending the new flow control credits to the upstream node.

13. The non-transitory computer-readable storage medium of claim 9, wherein the message is associated with the second virtual channel prior to the message reaching an arbitration point in the node.

14. The non-transitory computer-readable storage medium of claim 13, wherein the method further comprises arbitrating based on the second virtual channel for forwarding the message, wherein the arbitration includes determining availability of resources associated with the second virtual channel.

15. The non-transitory computer-readable storage medium of claim 9, wherein selecting the second virtual channel further comprises applying an offset value in the mapping rule to the first virtual channel.

16. The non-transitory computer-readable storage medium of claim 9, wherein the first virtual channel belongs to a first set of virtual channels and the second virtual channel belongs to a second set of virtual channels, and wherein the mapping rule indicates channel switching from the first set of virtual channels to the second set of virtual channels.

17. A computer system, comprising:
a processor;
an egress logic block to allocate, from the computer system, flow control credits for a first virtual channel to an upstream node in the distributed computing environment;
an ingress logic block to:
receive, via a message path comprising the upstream node, a message on the first virtual channel based on the allocated flow control credits; and
store the message in a queue associated with an input port at which the message has been received;
a remapping logic block to:
determine whether the message is a candidate for changing the first virtual channel to a different channel at the node based on a mapping rule associated with the input port;
in response to the message being a candidate, select a second virtual channel for the message based on the mapping rule and the first virtual channel;
associate the message with the second virtual channel in the queue; and
determine that the first virtual channel is an ingress virtual channel for the message based on metadata stored in the queue in association with the message; and
wherein the egress logic block is further to send the message from the queue on the second virtual channel based on flow control credits for the second virtual channel.

18. The computer system of claim 17, wherein the remapping logic block is further to update a list associated with the second virtual channel with a location of the message in the queue, wherein a respective entry of the list corresponds to a message associated with the second virtual channel.

19. The computer system of claim 17, further comprising an arbiter to arbitrate based on the second virtual channel for forwarding the message, wherein the arbitration includes determining availability of resources associated with the second virtual channel.

20. The computer system of claim 17, wherein the ingress logic block is to select the second virtual channel by applying an offset value in the mapping rule to the first virtual channel.

* * * * *